United States Patent [19]

Graham et al.

[11] Patent Number: 4,513,438
[45] Date of Patent: Apr. 23, 1985

[54] AUTOMATED MICROSCOPY SYSTEM AND METHOD FOR LOCATING AND RE-LOCATING OBJECTS IN AN IMAGE

[75] Inventors: Marshall D. Graham, Framingham; David D. Cook, Jr., Concord, both of Mass.

[73] Assignee: Coulter Electronics, Inc., Hialeah, Fla.

[21] Appl. No.: 368,855

[22] Filed: Apr. 15, 1982

[51] Int. Cl.$^3$ .............................................. G06K 9/20
[52] U.S. Cl. .......................................... 382/6; 356/39; 364/416; 382/23; 382/44; 382/48
[58] Field of Search ........................................ 382/4-6, 382/23, 25, 26, 44, 45, 48; 358/107; 356/39, 40, 72, 73; 364/413, 415, 416

[56] References Cited

U.S. PATENT DOCUMENTS

| | | | |
|---|---|---|---|
| 3,748,644 | 7/1973 | Tisdale | 382/23 |
| 3,848,962 | 11/1974 | Nelson | 350/86 |
| 3,851,972 | 12/1974 | Smith et al. | 356/39 |
| 4,060,713 | 11/1977 | Golay | 364/416 |
| 4,135,147 | 1/1979 | Riganati et al. | 382/5 |
| 4,272,756 | 6/1981 | Kakumoto et al. | 382/23 |

OTHER PUBLICATIONS

Elsey, "Fingerprint Minutiae Matcher", International Publication #WO82/01434, Apr. 29, 1982.
Golay, M. J. E., "Hexagonal Parallel Pattern Transformations", *IEEE Transactions on Computers*, vol. C-18, No. 8, Aug. 1969, pp. 733-740.
Munteanu, C., "Evaluation of the Sequential Similarity Detection Algorithm Applied to Binary Images", *Pattern Recognition*, vol. 13, No. 2, pp. 167-175, 1981.
Preston, K., Jr., "Feature Extraction by Golay Hexagonal Pattern Transforms", *IEEE Transactions on Computers*, vol. C-20, No. 9, Sep. 1971, pp. 1007-1014.
Preston, K., Jr., and Norgren, P. E., "Interactive image processor speeds pattern recognition by computer", *Electronics*, Oct. 23, 1972, pp. 89-98.
Norgren, P. E. et al., "Leukocyte Image Analysis in the diff3 System", *Pattern Recognition*, vol. 13, No. 4, pp. 299-314, 1981.
Graham, M. D. and Norgren, P. E., "The diff3 Analyzer: A parallel/serial Golay Image Processor", *Real-Time Medical Image Processing*, 1980, pp. 163-182.
Brenner, H. W. J. F. and Neurath, R. W., "Cross-Correlation Digital Registration Techniques for Multispectral Cell Images", *Comput. Biol. Med.*, 1978, vol. 8, pp. 71-80.
Ng, K. Y. K., "An Automatic Image Registration and Overlay System", *Comput. & Elect. Engng.*, vol. 4, pp. 71-85, 1977.
Voles, R., "Image registration using the likelihood ratio", *Proc. IEEE*, 125, 686-690, 1978.
Svedlow, M., McGillem, C. D. and Anuta, P. E., "Image Registration: Similarity Measure and Preprocessing Method Comparisons", *IEEE Transactions on Aerospace & Electronic Systems*, vol. AES-14, No. 1, Jan. 1978, pp. 141-149.
Sadjadi, F. A. and Hall, E. L., "Image registration using material information", *Optical Engineering*, vol. 19, No. 5, Sep./Oct. 1980, pp. 764-768.
Ingram, M. and Preston, K., Jr., "Automatic Analysis of Blood Cells", *Scientific American*, pp. 72-82.

*Primary Examiner*—Leo H. Boudreau
*Attorney, Agent, or Firm*—Lahive & Cockfield

[57] ABSTRACT

A microscopy system for automatically locating and re-locating objects-of-interest in an image which has one or more objects against a background. Each of the objects-of-interest is characterized by a predetermined set of features. In a preferred form, the invention is specifically directed to an automated microscopy system which is adapted for automatically analyzing biological (e.g., blood or cervical) cells on microscope slides. In other forms of the invention, differing types of objects may be identified as being objects-of-interest during a first automated pass and then re-located during a second pass for further analysis.

29 Claims, 7 Drawing Figures

AUTOMATED MICROSCOPY SYSTEM AND METHOD FOR LOCATING AND RE-LOCATING OBJECTS IN AN IMAGE

REFERENCE TO RELATED PATENTS

The subject matter of the present application is related to that in U.S. Pat. No. 3,851,972 to Smith and U.S. Pat. No. 4,060,713 to Golay. Those patents are incorporated herein by reference.

BACKGROUND OF THE INVENTION

The present invention relates to image processing and more particularly to automated microscopy systems and methods for locating and re-locating objects of interest in an image.

The present invention is particularly well suited for use in an automated microscopy system for analyzing biological objects (such as blood cells) on a microscope slide. Generally, with such an automated analysis system, cells on a slide are initially scanned and a digitized image of the cell configuration is generated. This image is processed to determine, or extract various features of the scanned cells. Based on these identified features, the cells are then classified by the system. Often, certain of the cells are either unclassifiable (by the system), or for other reasons, require further analysis, either by a human operator or by further machine processing. Records of such cells, identified as objects of interest, are stored so that those cells may be subsequently re-located for the required further analysis. After the slide (or a number of additional slides) has been analyzed on a first pass, the system automatically returns to selected (or flagged) areas having objects-of-interest for further analysis. In most instances, the slides must be removed from the microscope stage prior to the further analysis. In order to perform this further analysis, accurate and repeatable re-location of the objects-of-interest on the microscope slide is essential.

Several designs for accomplishing these objectives have been described and implemented in the prior art, such as that shown in U.S. Pat. No. 3,851,972, issued Dec. 3, 1974. The method taught by this patent re-locates individual objects (cells, specifically) through computer memorization of the slide location in the cassettes (or slide identification indicia) and coordinate signals representative of a specific cell's location on the slide. In the commercial implementation of this patented design, cell location is memorized as stage X and Y coordinates, (as taken from step counters) referenced to the instrument's "Home" position, i.e., the position of the stage when the slide may be loaded onto the stage. When the slide is reloaded onto the microscope stage, a servo controlled mechanical assembly returns the slide to its original position based upon the memorized coordinates. This (and all other known methods for object re-location) requires highly repeatable and precise repositioning of the stage's home position relative to the instrument's optical axis and equally precise repositioning of the slide in the stage's slide holder on re-loading. These requirements arise in the open-loop nature of such relocation methods and in practice result in excessively demanding tolerances on mechanical components and electrical drive circuitry, with correspondingly great hardware cost.

In other applications, such as numerical-controlled machine tools, and in some research automated microscopes, closed-loop positioning servos incorporating linear encoders or similar sensors are used to provide precise positioning of an element. While the degree of precision permitted by such systems would satisfy the requirements for most automicroscopy applications, the hardware cost is too high to permit their use in commercial automated microscopes.

It is an object of the present invention to provide an improved automated microscopy system and method for locating and re-locating objects-of-interest in an image.

It is another object to provide an improved microscopy system and method for automatically analyzing objects-of-interest on a microscope slide and subsequently re-locating those objects-of-interest for further analysis.

SUMMARY OF THE INVENTION

The present invention is directed to a system for automatically locating and re-locating objects-of-interest in an image which has one or more objects against a background. Each of the objects-of-interest is characterized by a predetermined set of features. In a preferred form, the invention is specifically directed to an automated microscopy system which is adapted for automatically analyzing biological (e.g., blood or cervical) cells on microscope slides. In other forms of the invention, differing types of objects may be identified as being objects-of-interest during a first automated pass and then re-located during a second pass for further analysis.

Generally, the invention includes a selectively operable object identifier. The object identifier includes a detector for scanning the image and detecting objects in that image. A feature extractor identifies particular ones of the detected objects which have the predetermined set of features, as objects-of-interest. This "predetermined set of features" determination may be made for a given object, for example, by determining a weighted sum of values, on a vector, representative of detected elementary features. With this approach the weighted sum vector may be compared with a set of stored reference vectors to identify a correspondence with, i.e. an identification of, one of those stored reference vectors. An object may be determined to be an object-of-interest upon determination of a substantial match of the weighted sum vector with one of the stored reference vectors. Alternatively, an object may be determined to be an object-of-interest when no substantial match is determined. In the latter case the object-of-interest would be classified as "unidentifiable". In various forms of the invention, any number of classes or types of objects-of-interest may be defined. Other definitions of the predetermined set of features may also be used.

An object marker generates a marker signal for the identified objects-of-interest. The marker signal includes a feature portion representative of the predetermined set of features of the identified object-of-interest. The marker signal further includes a pattern portion representative of the relative distance and relative orientation of a plurality of detected objects neighboring the identified object-of-interest.

A selectively operable memory is used for storing the marker signals generated by the object marker.

A selectively operable comparator is adapted to compare a currently generated marker signal with the stored marker signals in the memory. The comparator further is adapted to detect a substantial match of the pattern portion of that current marker signal with the corresponding portion of one of the stored marker signals, and in response, generate an "object re-located" signal indicative of that match.

A controller provides overall control of the system. In a first or locate mode, the controller operates the object identifier and the memory so that those elements generate and store the marker signals. In a re-locate or review mode, the controller operates the object identifier and the comparator so that those elements again scan the image and generate a succession of current marker signals for detected objects-of-interest, and successively compare those current marker signals with the stored marker signals generated previously in the locate mode. The "object re-located" signal generated by the comparator indicates that an object-of-interest has been re-located in the microscope stage. The object re-located signal can be used, for example, to advise an operator that an object-of-interest has been re-located.

In an alternate form of the invention, the system may include just the object identifier and the memory. The marker signals stored in the memory of this form of the invention may be used in conjunction with a separate system which includes an object identifier and comparator, as described above, and in addition, a controller which operates in response to signals corresponding to the stored marker signals to re-locate objects in the image in the manner described above.

The apparatus and method embodying the invention provides a desirable approach, from both the technical and economic perspectives, for re-locating objects in an image in a closed-loop fashion. In the re-locate mode, the invention responds to fiducials in the image itself, by using information about the object-of-interest and its neighboring objects. In an automated microscope for analysis of blood cells, for example, memorization of such information during initial automated analysis, and its use during re-location for review, greatly relaxes tolerances on both stage positioning and slide repositioning in the stage slide holder. In addition, the invention substantially removes questions as to whether the reference points on the stage (as induced by count errors or jolting) or the slide (as by chipping or abrasion) may have changed since the slide was initially analyzed. Moreover, ambiguity is eliminated as to which of two adjacent cells it was desired to re-locate. Hence, the invention permits the use of relatively simple, inexpensive and more reliable hardware, with less ambiguity in results than any current method of re-presenting previously analyzed objects for analysis.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
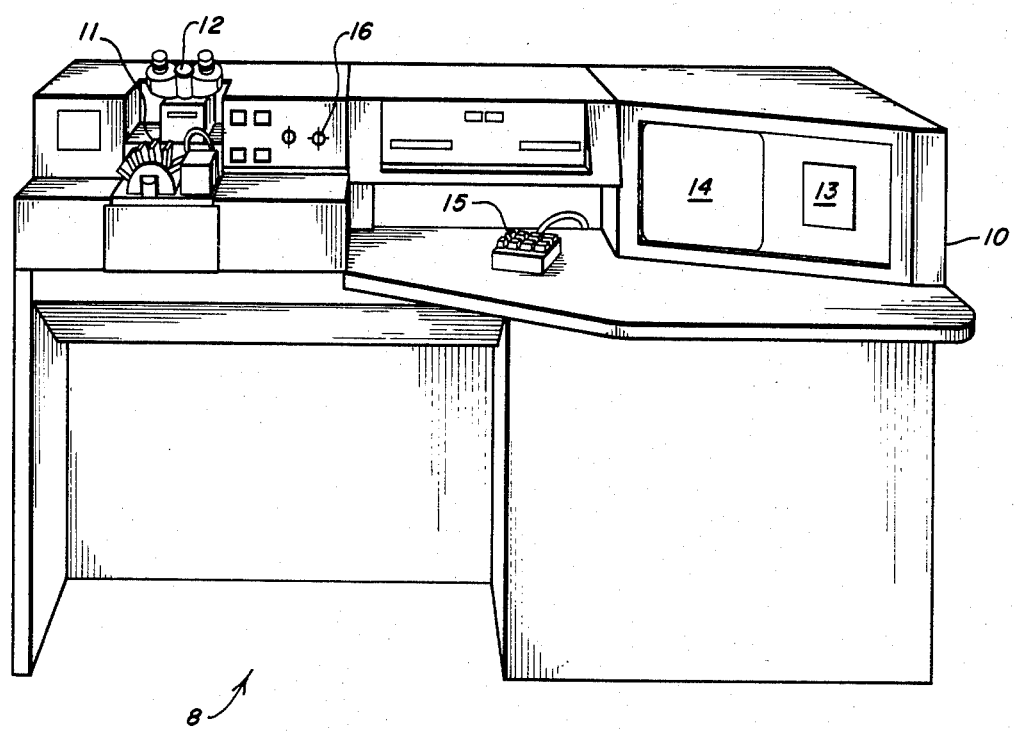
FIG. 1 shows an exemplary, automated microscopy system embodying the present invention.

FIG. 1 shows a preferred form of an automated microscopy system 8 for re-locating biological cells on a microscope slide in accordance with the present invention. The system 8 is a variation of a conventional automated microscopy apparatus commerically available and is sold under the Trademark "diff3" by Coulter Biomedical Research Corporation of Concord, Mass. The modified diff3 system 8 accepts a cassette holding fourteen blood smear slides. If none require reviewing, the system 8 can automatically process the full load without interruption. If a given specimen is normal, leukocytes will be classified (into segmented or band neutrophils, basophils, eosinophils, lymphocytes, and monocytes); the erythrocytes will be evaluated for normalcy of size, shape, and color; and the platelet count will be estimated. The results are printed out for each slide, and the analyzer signals the operator when it has completed the cassette. Should the specimen be abnormal, nucleated erythrocytes, immature granulocytes, blasts or atypical lymphocytes may be found; for these, as well as for occurrence of normal cell types at greater than normal rates, the system 8 indicates that the smear should be reviewed. It can also be set to flag specimens with abnormal erythrocyte morphology or platelet estimates. In a re-locate or review mode, system 8 will automatically re-locate selected areas on selected slides having objects-of-interest. Hence, slides can be manually or automatically re-accessed after their initial examination and repositioned under the microscope.

Although the object re-location method and system embodying the invention is shown implemented in the microscopy apparatus of the diff3 type, the method and system can alternatively be implemented in any automated microscopy apparatus which provides handling, scanning object detection and feature extraction for microscope slide in a cassette.

The system 8 of FIG. 1 is mounted in a console 10. A cassette 11 containing a number of slides of cell samples to be analyzed is mounted in the console 10. Microscope 12 provides magnification and visual observation facilities for study of the cells on each slide. In addition, a visual observation system including a video camera (not shown) and video monitor 13 allows for observation of the slide areas magnified by microscope 12. Cathode ray tube 14 provides a visual read-out of information stored in an information memory within console 10. A keyboard 15 allows for the manual initiation of a number of functions by the analyzer as more fully explained subsequently herein. Control stick 16 allows the microscope field of vision to be moved to particular areas on the slide being studied.

Figure 2:
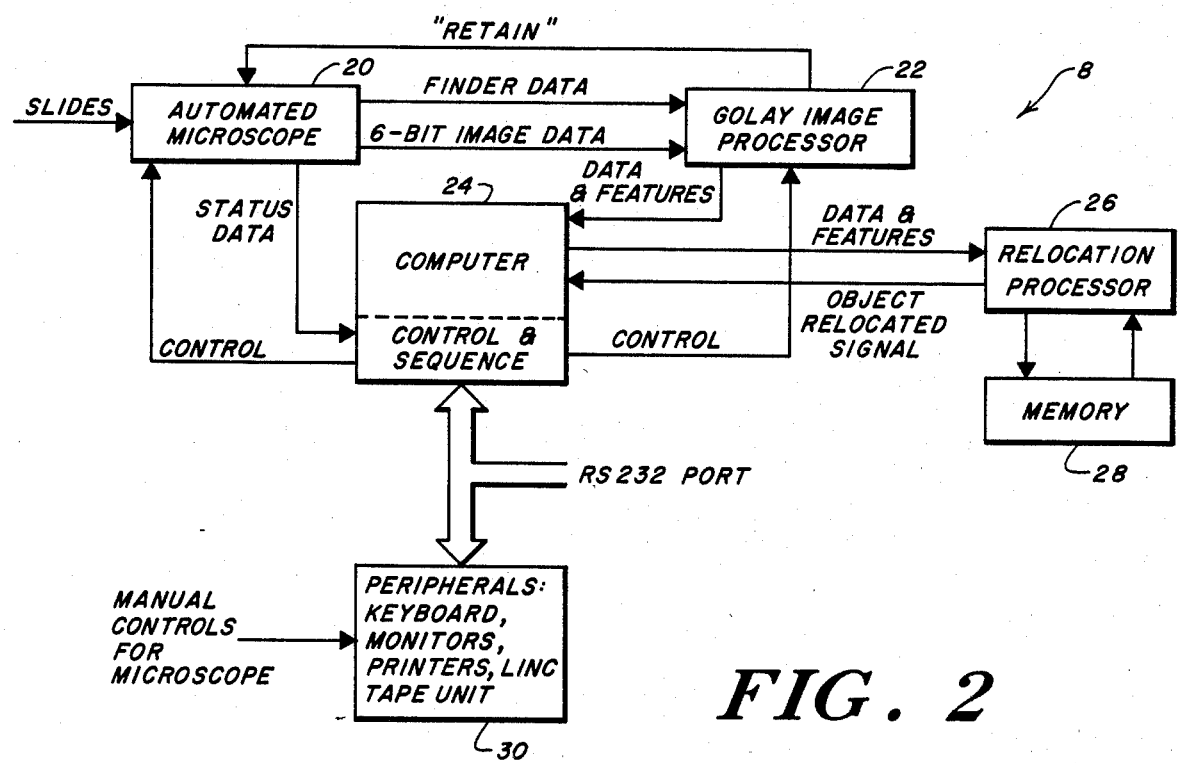
FIG. 2 shows a block diagram of the system of FIG. 1.

FIG. 2 shows a block diagram for the system of FIG. 1. The system 8 includes an automatic microscope 20 (including an associated slide handling mechanism), a Golay image processor 22, a computer 24, a re-location processor 26 and associated memory 28 and a set of peripherals 30.

The specific details of the above-described conventional portions of system 8 are well known and are shown in more detail in U.S. Pat. Nos. 3,851,972;

4,060,713 and 4,183,013. The conventional portions of apparatus 8 have been commercialized under the trademark "diff3" and are discussed in detail in the article entitled "Leukocyte Image Analysis in the diff3 System", *Pattern Recognition*, Vol. 13, No. 4, pp. 299–314, 1981 and in the article "The diff3 Analyzer: A Parallel/Serial Golay Image Processor", *Real-Time Medical Image Processing*, edited by M. Onoe, K. Preston, Jr., and A. Rosenfeld, pp. 163–182, 1980.

The automated microscope 20 and the Golay image processor 22 are general applicability devices adapted as special-purpose peripherals to the minicomputer 24, a general-purpose 16-bit computer. Other peripherals 30 include two joysticks, for manual control of the automated microscope's focus and stage drives; a keyboard and a data monitor, for operator interaction, a second black-and-white monitor, for display of image scans and their processing; two printers for report output; an audio alarm, for signaling; and a tape drive, for loading operational and diagnostic software and for temporary storage of low-speed data. Provision is also made for control of the analyzer by, or data passage to, an external computer via a standard RS-232 port.

Figure 3:
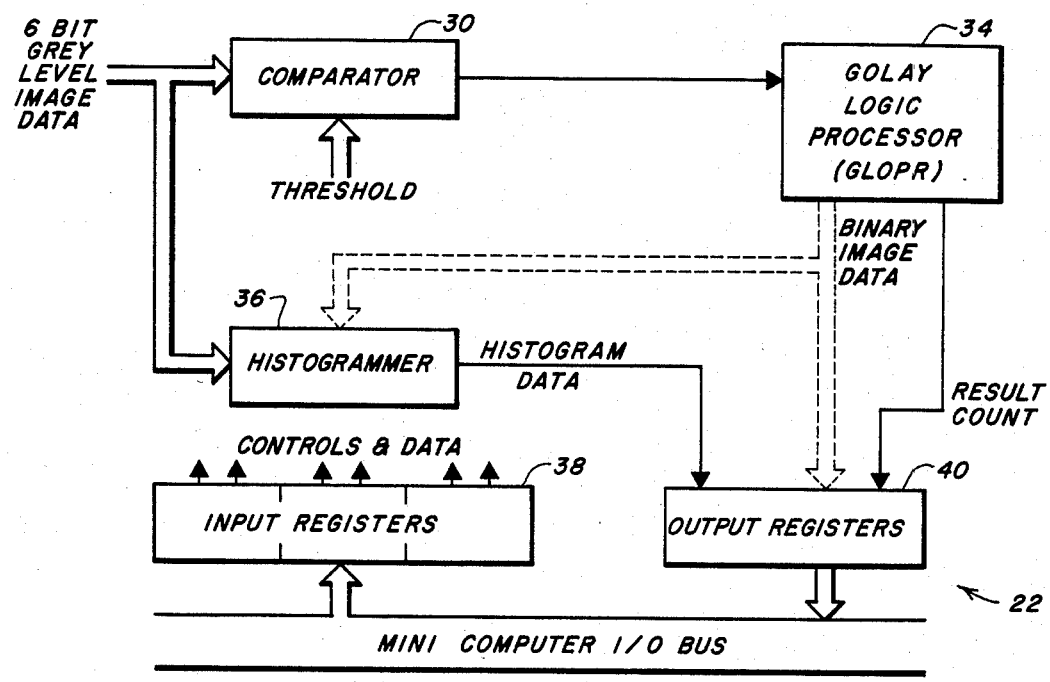
FIG. 3 shows a block diagram of the image processor of the system of FIG. 2.

The Golay image processor 22 is shown in detailed block diagram form in FIG. 3. Processor 22 includes a comparator 30, Golay logic processor (GLOPR) 34 and a histogrammer 36. Input registers 38 and output registers 40 couple processor 22 to computer 24.

Figure 4:
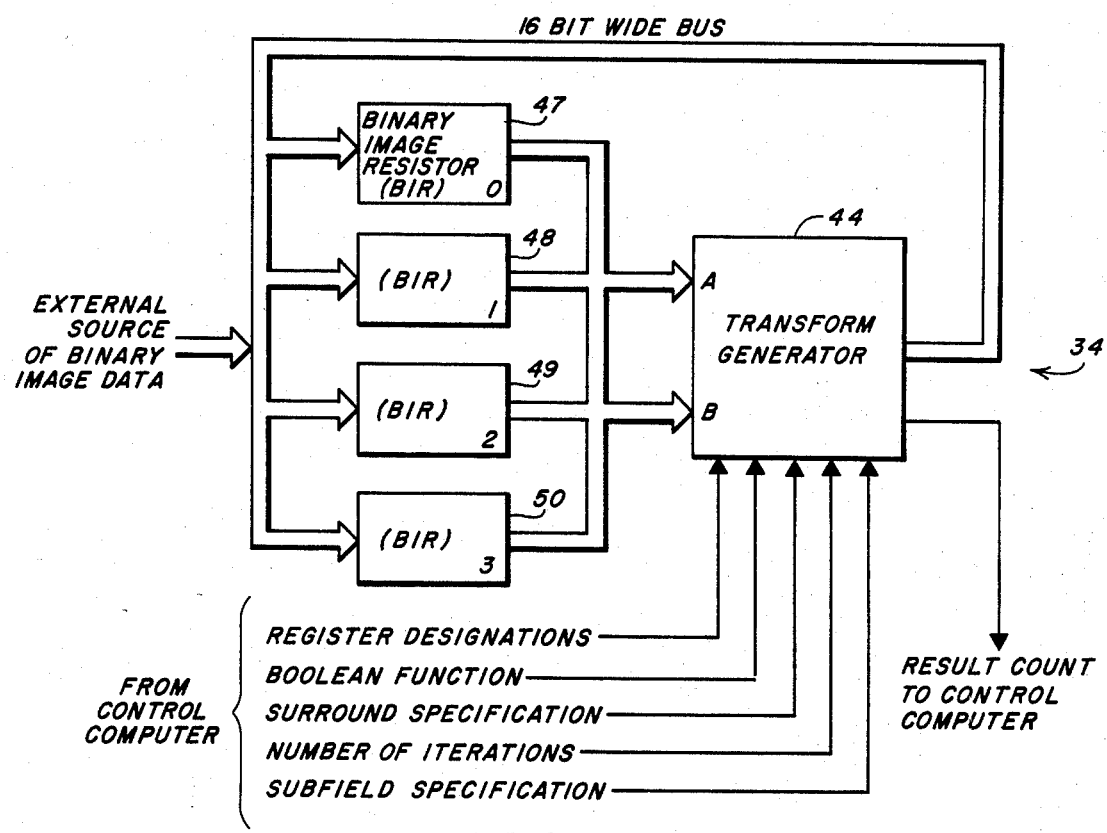
FIG. 4 shows a block diagram of the logic processor of the image processor of FIG. 3.

The GLOPR 34 is shown in detailed block diagram form in FIG. 4. GLOPR 34 includes a transform generator 44 and binary image registers 47–50.

Figure 5A:
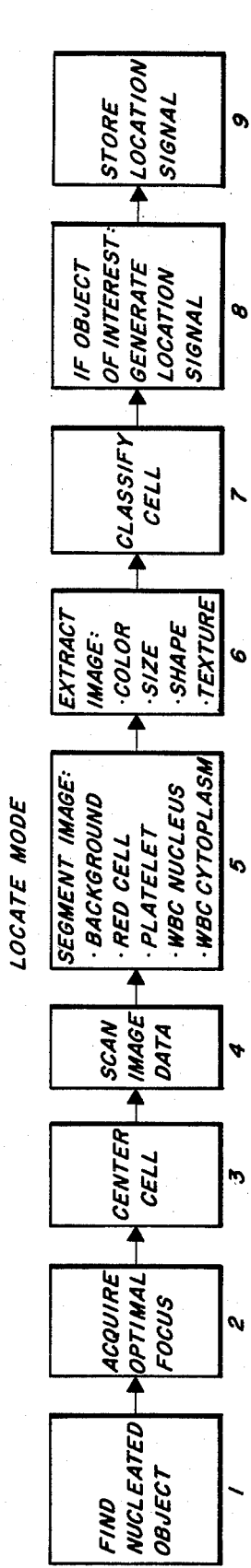
FIGS. 5A and 5B show flow charts illustrating the locate and re-locate mode operation of the system of FIG. 1.
Figure 5B:
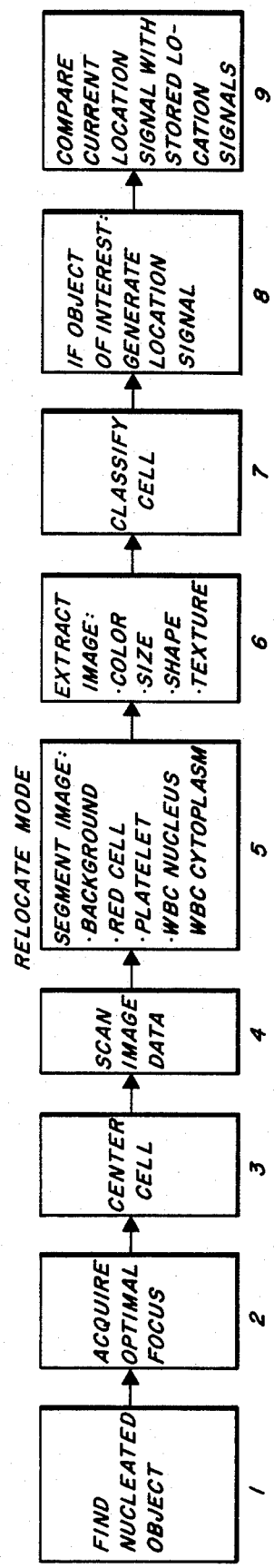

The operation of system 8 is illustrated in FIGS. 5A and 5B for the locate and re-locate modes, respectively. The computer 24 exercises general control of system operation, basically controlling the operations depicted by blocks 1–7 of FIGS. 5A and 5B. Upon identifying an object-of-interest in the locate mode, data and feature signals are transferred to the relocation processor 26, which in turn generates marker signals which are stored in memory 28. In the re-locate mode, processor 26 operates similarly to again generate current signals. However, in the latter mode, the marker signals are compared with the stored marker signal to detect match. Upon that detection, an object-re-located signal is returned to computer 24.

The operation of the exemplary automated microscopy system 8 of FIGS. 1 and 2 will now be described in detail in conjunctions with FIG. 6 which shows a schematic representation of an exemplary two dimensional image 100. In that figure, the image includes a plurality of objects against a background. There are three types of objects; the first being represented by black circular dots, the second being represented by black square dots and the third being represented by black triangular dots. The image of FIG. 6 may be for example a processed representation of a portion of a blood smear on a microscope slide in which the dots represent the centroids of objects (such as whole cells, broken cells, debris, stain precipitate, or the like) in the smear. The square dots represent centroids of cells having a particular set of features (which may satisfy the criteria for "blasts", for example). The triangular dots represent the centroids of cells or other objects having a particular set of features which render them "unidentifiable", requiring further review. In this example, both square and triangular dots represent objects-of-interest. The circular dots represent the centroids of all other cells or objects in the smear. In the following description, the system is considered to include an object detector portion, a feature extractor portion, an object marker portion, a memory portion and a comparator portion.

In operation, under the control of computer 24 in the locate mode, the object detector portion (elements 20 and 24) of system 8 initially scans a field of view on a microscope slide and detects each of the objects in its current field of view of that slide. The feature extractor portion (elements 22 and 24) processes the data provided by the object detector portion and classifies the objects detected. In terms of FIG. 6, the feature extractor portion generates data representative of the circular, triangular, and square dots within field of view 102. At this point, the feature extractor portion has in effect classified all objects in the field of view 102, and reduced each object to a centroid, specifying its object type (including "unidentifiable") and location in the field of view.

The object marker portion (in processor 26) then generates a marker signal for each object-of-interest (i.e. the square and triangular dots) in the field of view 102. The marker signal includes a first, or feature, portion indicating that the object is an object-of-interest and its type. The marker signal also includes a second, or pattern, portion which is representative of the location of all neighboring objects relative to the object-of-interest within a radius R of that object-of-interest. In the presently described embodiment, R is pre-selected to accommodate the object density in the field of view. For relatively high densities, R may be small and for relatively low densities, R may be large. In alternative embodiments, R may be adaptively controlled to accommodate the actual detected object density. In the latter form, R may be determined for each object-of-interest when a predetermined number of nearest neighbors are identified. In the present example, this location is expressed in terms of angular displacement $\theta$ from a reference axis 80 and distance, r, from the object-of-interest. Alternatively, the location of the neighbors may be expressed in terms of orthogonal translational offsets from a reference point in the field of view. In practice where the images are roster scanned, the coordinates may be in terms of scan line (Y) and pixel position (X) in a scan line.

Figure 6:
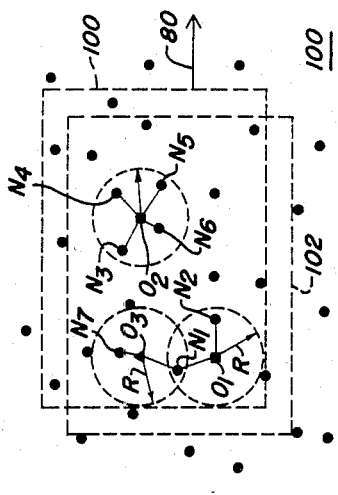
FIG. 6 shows an exemplary image for illustrating the operation of the system of FIG. 1.

For the example of FIG. 6, using the r, $\theta$ representation, there are three objects of interest $O_1$, $O_2$ and $O_3$ in the field of view 102. For object $0_1$, there are two neighboring objects $N_1$ and $N_2$ within R from $0_1$. For object $O_2$, there are four neighboring objects $N_3$, $N_4$, $N_5$, and $N_6$ within R from $0_2$. For object $0_3$, there are two neighboring objects $N_1$ and $N_7$ within R from $0_3$. As a result, the object marker portion generates marker signals as shown in the following Table:

TABLE

| Object | Feature | Pattern |
|---|---|---|
| $O_1$ | B | $r_1, \theta_1; r_2, \theta_2$ |
| $O_2$ | B | $r_3, \theta_3; r_4, \theta_4; r_5, \theta_5; r_6, \theta_6$ |
| $O_3$ | U | $r_1, \theta_1; r_7, \theta_7$ |

In that Table, and $r_i$ and $\theta_i$ represent the radial and angular offsets associated with the respective neighbor $N_i$. B is a tag representative of the type (e.g. blast) of the objects $0_1$ and $0_2$ of-interest, and U is a tag representative of the type (unidentifiable) of the object $0_3$. The marker signals are stored in memory 28 for subsequent use.

In operation, in the re-locate, or review, mode, under the control of controller 24, the object detector portion again scans a field of view on the slide and detects each of the objects in its field of view. However, during the review mode operation, the slide may have been displaced (or arbitrarily re-positioned) relative to the working coordinates of the object detector portion. For example, with an automated microscopy system of the diff3 type, typically a number of slides are sequentially processed in the locate mode, and then one or more of those slides may be re-processed in the re-locate, or review, mode. Between these processing steps, a slide may be physically removed and replaced with respect to the working coordinates of object detector portion, leading to offsets in slide position during the review mode processing. As a result, the field of view during the review mode operation may generally correspond to field of view 110 in FIG. 6 in the present example.

Using the detected object data determined for field of view 110, the feature extractor classifies all objects in that field of view in the same manner as in the locate mode.

The object marker portion then generates marker signals for each object-of-interest in the field of view 110, in the same manner as described above in the locate mode. These marker signals are generally similar to those generated in the locate mode, except that for objects-of-interest near the edge of the field of view 110, one or more of the neighboring objects may not be included. As these marker signals are generated in the review mode, the comparator portion (in element 26) compares the current marker signal with the marker signals previously stored in the memory 28. Upon detecting a match (substantial match, for example to accommodate objects-of-interest near the edge of the field of view) during this comparison, an object-re-located signal is generated indicative of that match. This signal may alert an operator that an object-of-interest is then available for on-line viewing and analysis. Alternatively, the controller 24 may initiate further automatic analysis for the object-of-interest.

In one form of the invention, when an object-of-interest is re-located, the controller 24 may automatically drive the microscope stage so that the object is centered in the field of view and a human operator may then view, for example on the microscope R or CRT 13, the object without ambiguities as to which object-of-interest is the currently re-located object-of-interest. Rather than driving the re-located object-of-interest to the center of the field of view, alternatively a cursor, or flashing background, may be used on CRT 13 to unambiguously identify the re-located object.

While in the present embodiment, the re-location processor 26 and associated memory 28 have been described as being separate from computer 24, in other embodiments, the computer 24 may be configured to perform the functions ascribed above to processor 26 and memory 28.

The invention may also be configured to operate with variations from the above-described operation. For example, the neighbor objects may be defined to be within either a predetermined or adaptively determined limited angular sector and/or range. As another example, the neighbor object criteria may not be based on a determined distance from the object-of-interest, but rather be based on a distance equal to a multiple of the diameter of the object-of-interest. The latter criterion might also be coupled to an angular sector limitation.

Additionally, the processing of objects-of-interest may be performed only for objects-of-interest greater than a predetermined distance from the edge of the field of view (to ensure that all neighbors within the criteria are included, in both the locate and review mode).

In yet another variation, in addition to the feature and pattern portion, the object marker may also generate a coordinate portion for the marker signal, representative of the location within the image of the identified object-of-interest. This coordinate portion may be used during the review mode wherein each object-of-interest is generally accessed in the field of view and then the pattern portion of the associated current marker signal is compared with the stored marker signals. Moreover, when the field of view during the review mode is so displaced with respect to the locate mode field of view so that the pattern portions of current marker signals generated in the review mode do not substantially match any of the pattern portions of stored marker signals, then the field of view used in the review mode may be automatically shifted. For example, the shift may have the form of a rectangular spiral until a pattern portion match is found. Then, the coordinate portions of the marker signals may be offset by the field of view shift required to attain a pattern portion match.

In other variations, the pattern portions of the location signals may be representative of different geometric descriptor data, such as cartesian coordinates referenced to an arbitrary reference point in the field of view. In the latter case, the coordinates of the object-of-interest relative to that reference point are also stored.

The preferred embodiment has been described above for locating and re-locating objects-of-interest in an image based in two orthogonal geometrical dimensions. The same techniques are suitable in conjunction with a three-dimensional image. The third dimension may be a geometrical dimension, or alternatively may have some other form independent of first two geometrical dimensions, such as time, grey level, or fluorescence.

The invention may be embodied in other specific forms without departing from the spirit or essential characteristics thereof. The present embodiments are therefore to be considered in all respects as illustrative and not restricitve, the scope of the invention being indicated by the appended claims rather than by the foregoing description, and all changes which come within the meaning and range of equivalency of the claims are therefore intended to be embraced therein.

We claim:

1. A microscopy system for automatically locating objects-of-interest in an image having one or more objects against a background, each of said objects-of-interest being characterized by a predetermined set of features, comprising:

object identifier including
   i. detecting means for scanning said image and detecting one or more of said objects during said scanning,
   ii. feature extraction means for identifying ones of said detected objects having said predetermined set of features as objects-of-interest,
   iii. object marker means for generating a marker signal for each of one or more identified object-of-interest, said marker signal having a feature portion representative of said predetermined set of features of said identified object-of-interest, and a pattern portion representative of the relative distance and relative orientation of a plurality of detected objects neighboring said identified object-of-interest.

2. A system according to claim 1 wherein said object identifier is selectively operable, and further comprising:

selectively operable memory means for storing said marker signals generated by said object identifier means, selectively operable comparison means for comparing a currently generated marker signal with said stored marker signals, means for detecting a substantial match of the pattern portion of said current marker signal and the pattern portion of one of said stored marker signals, and means for generating an object-re-located signal indicative of said match, and a controller including means operative in a locate mode for operating said object identifier, and said memory means, and including means operative in a re-locate mode for operating said object identifier and said comparison means.

3. A system according to claim 1 wherein said object marker means further includes means for generating coordinate signals for each identified object-of-interest, said coordinate signals being representative of the location of said identified object-of-interest in said image.

4. A system according to claim 3 wherein said object marker means further includes means for generating coordinate signals for each of said neighboring objects, said coordinate signals being representative of the location of said neighboring objects in said image.

5. A system according to claim 1 wherein said object marker means includes means for generating said pattern portion whereby said pattern portion is representative of radial and angular offsets from said identified object-of-interest to each of said neighboring objects.

6. A system according to claim 1 wherein said object marker means includes means for generating said pattern portion whereby said pattern portion is representative of a plurality of orthogonal translational offsets from said identified object-of-interest to each of said neighboring objects.

7. A system according to claim 1 wherein said detecting means includes means for scanning a two-dimensional image.

8. A system according to claim 1 wherein said detecting means includes means for scanning a three-dimensional image.

9. A system according to claim 2 wherein said object marker means further includes means for generating coordinate signals for each identified object-of-interest, said coordinate signals being representative of the location of said identified object-of-interest in said image.

10. A system according to claim 9 wherein said object marker means further includes means for generating coordinate signals for each of said neighboring objects, said coordinate signals being representative of the location of said neighboring objects in said image.

11. A system according to claim 2 wherein said object marker means includes means for generating said pattern portion whereby said pattern portion is representative of radial and angular offsets from said identified object-of-interest to each of said neighboring objects.

12. A system according to claim 2 wherein said object marker means includes means for generating said pattern portion whereby said pattern portion is representative of a plurality of orthogonal translational offsets from said identified object-of-interest to each of said neighboring objects.

13. A system according to claim 2 wherein said detecting means includes means for scanning a two-dimensional image.

14. A system according to claim 2 wherein said detecting means includes means for scanning a three-dimensional image.

15. A system according to claim 1 or 2 wherein said object marker means includes means for identifying neighboring objects for said identified objects-of-interest, wherein said neighboring objects correspond to objects within a determined distance of said object-of-interest.

16. A system according to claim 15 wherein said determined distance is predetermined.

17. A system according to claim 16 wherein said object marker means includes means for identifying neighboring objects for said identified objects-of-interest, wherein said neighboring objects further correspond to objects within a determined angular sector extending from said object-of-interest.

18. A system according to claim 17 wherein said determined angular segment is predetermined.

19. A system according to claim 17 wherein said determined angular segment is adaptively determined.

20. A system according to claim 15 wherein said determined distance is adaptively determined.

21. A system according to claim 20 wherein said object marker means includes means for identifying neighboring objects for said identified objects-of-interest, wherein said neighboring objects further correspond to objects within a determined angular sector extending from said object-of-interest.

22. A system according to claim 21 wherein said determined angular sector is predetermined.

23. A system according to claim 21 wherein said determined angular sector is adaptively determined.

24. A microscopy method for automatically locating objects-of-interest in an image having one or more objects against a background, each of said objects-of-interest being characterized by a predetermined set of features, comprising the steps of identifying objects by
  i. scanning said image and detecting one or more of said objects during said scanning,
  ii. identifying ones of said deleted objects having said predetermined set of features as objects-of-interest,
  iii. generating a marker signal for each of one or more identified object-of interest, said marker signal having a feature portion representative of said predetermined set of features of said identified obejct-of-interest, and a pattern portion representative of the relative distance and relative orientation of a plurality of detected objects neighboring said identified object-of-interest.

25. A method according to claim 24 wherein said object identifying step is selectively performed, and comprising the further steps of selectively storing said marker signals generated by said location-defining means, selectively comparing a currently generated marker signal with said stored marker signals, detecting a substantial match of the pattern portion of said current marker signal and the pattern portion of one of said stored marker signals, and generating an object-re-located signal indicative of said match, and in a locate mode performing said object identifying step, and said storing step, and in a re-locate mode performing said object identifying step and said comparing step.

26. A method according to claim 24 or 25 wherein said marker generating step further includes the step of generating coordinate signals for each identified object-of-interest, said coordinate signals being representative of the location of said identified object-of-interest in said image.

27. A method according to claim 26 wherein said marker generating step further includes the step of generating coordinate signals for each of said neighboring objects, said coordinate signals being representative of the location of said neighboring objects in said image.

28. A method according to claim 24 or 25 wherein said marker generating step includes the step of generating said pattern portion whereby said pattern portion is representative of radial and angular offsets from said identified object-of-interest to each of said neighboring objects.

29. A method according to claim 24 or 25 wherein said marker generating step includes the step of generating said pattern portion whereby said pattern portion is representative of a plurality of orthogonal translational offsets from said identified object-of-interest to each of said neighboring objects.

* * * * *

UNITED STATES PATENT AND TRADEMARK OFFICE
CERTIFICATE OF CORRECTION

PATENT NO. : 4,513,438
DATED : April 23, 1985
INVENTOR(S) : Marshall Donnie Graham and David D. Cook, Jr.

It is certified that error appears in the above-identified patent and that said Letters Patent is hereby corrected as shown below:

Page 1 of 3

In the second column on the cover sheet, line 6:
"Brenner, H.W.J.F." should read --Williams, H., Brenner, J.F.--.

In the second column on the cover sheet, "Ingram, M. and Preston, K., Jr., "Automatic Analysis of Blood Cells", Scientific American, pp. 72-82" should read --Ingram, M. and Preston, K., Jr., "Automatic Analysis of Blood Cells", Scientific American, Nov. 1970 (Vol. 223), pp.72-82--.

In Fig. 4: "resister" in 47 should read --register--.

In Fig. 6: "100" labelling the second field of view should read --110--.

Column 1, line 23: a comma was left out following "extract".

Column 3, line 19: "slide on the" was left out between "the" and "microscope".

Column 4, line 44: "slide" needs an "s" added.

Column 5, line 16: the comma between "interaction" and "a" should be a semicolon.

Column 5, line 41: "again" should be deleted.

Column 6, line 43: "roster" should read --raster--.

Column 6, lines 48 and 49: "$0_1$" should read --$0_1$--.

Column 6, line 51: "$0_2$, $0_3$" should read --$0_2$, $0_3$--.

UNITED STATES PATENT AND TRADEMARK OFFICE
CERTIFICATE OF CORRECTION

PATENT NO. : 4,513,438

DATED : April 23, 1985

INVENTOR(S) : Marshall Donnie Graham and David D. Cook, Jr.

It is certified that error appears in the above-identified patent and that said Letters Patent is hereby corrected as shown below:

Column 6, line 52: "$O_3$" should read --$O_3$--.

Column 6, line 65: "$O_1$, $O_2$" should read --$O_1$, $O_2$--.

Column 6, line 66: "$O_3$" should read --$O_3$--.

Column 7, line 14: "of object" should read --of the object--.

Column 7, line 46: "R" should read --12--.

Column 9, line 17: "identifier, and" should read --identifier and--.

Column 10, line 46: "deleted" should read --detected--.

Column 10, line 60: "location defining means" should read --generating step--.

UNITED STATES PATENT AND TRADEMARK OFFICE
CERTIFICATE OF CORRECTION

PATENT NO. : 4,513,438

DATED : April 23, 1985

INVENTOR(S) : Marshall Donnie Graham and David D. Cook, Jr.

It is certified that error appears in the above-identified patent and that said Letters Patent is hereby corrected as shown below:

Column 8, line 44: "restricitve" should read --restrictive--.

Column 10, line 51: "obejct-of-" should read --object-of--.

Signed and Sealed this

Fourth Day of February 1986

[SEAL]

Attest:

DONALD J. QUIGG

Attesting Officer

Commissioner of Patents and Trademarks